(12) United States Patent
Katsurao et al.

(10) Patent No.: US 6,372,388 B1
(45) Date of Patent: Apr. 16, 2002

(54) VINYLIDENE FLUORIDE COPOLYMER FOR GEL-FORM SOLID ELECTROLYTE FORMATION, SOLID ELECTROLYTE, AND BATTERY

(75) Inventors: Takumi Katsurao; Katsuo Horie; Aisaku Nagai; Yukio Ichikawa, all of Fukushima-ken (JP)

(73) Assignee: Kureha Kaguka Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/463,301

(22) PCT Filed: Jul. 23, 1998

(86) PCT No.: PCT/JP98/03292

§ 371 Date: Jan. 24, 2000

§ 102(e) Date: Jan. 24, 2000

(87) PCT Pub. No.: WO99/05191

PCT Pub. Date: Feb. 4, 1999

(30) Foreign Application Priority Data

Jul. 24, 1997 (JP) ............................. 9-212726

(51) Int. Cl.[7] .......................... H01M 10/40; H01M 4/62
(52) U.S. Cl. ..................... 429/316; 429/317; 429/217; 429/303
(58) Field of Search .................. 429/217, 303, 429/316, 317; 526/255, 321, 329.4, 332

(56) References Cited

U.S. PATENT DOCUMENTS 5,415,958 A * 5/1995 Takahashi et al. .......... 429/217
6,180,282 B1 * 1/2001 Nishida et al. ......... 429/217 X

FOREIGN PATENT DOCUMENTS

| EP | 0 601 754 | 6/1994 |
| EP | 0 751 157 | 1/1997 |
| JP | 62-260806 | 11/1987 |
| JP | 2-604 | 1/1990 |
| JP | 3-17109 | 1/1991 |
| JP | 9-12639 | 1/1997 |
| JP | 9-22737 | 1/1997 |

OTHER PUBLICATIONS

Translation of Japanese 9–22737, 1/97.*

* cited by examiner

*Primary Examiner*—Stephen Kalafut
(74) *Attorney, Agent, or Firm*—Wenderoth, Lind & Ponack, L.L.P.

(57) ABSTRACT

A solid polymer electrolyte having improved ionic conductivity and adhesion with an electroconductive substrate and also remarkably enhanced heat resistance is formed with a vinylidene fluoride copolymer which contains 50–97 mol. % of vinylidene fluoride monomer and 0.1–5 mol. % of an unsaturated dibasic acid monoester or an epoxy group-containing vinyl monomer and further has been crosslinked, thereby improving the performances of a non-aqueous battery, such as a lithium ion battery.

12 Claims, 3 Drawing Sheets

VINYLIDENE FLUORIDE COPOLYMER FOR GEL-FORM SOLID ELECTROLYTE FORMATION, SOLID ELECTROLYTE, AND BATTERY

This application is a 371 of PCT/JP98/03292 filed Jul. 23, 1998.

TECHNICAL FIELD

The present invention relates to a vinylidene fluoride copolymer providing a polymer matrix for forming a gel-form solid electrolyte suitable for forming a non-aqueous battery, particularly a lithium ion battery, and a gel-form solid electrolyte formed of the vinylidene fluoride copolymer and a non-aqueous battery comprising the solid electrolyte.

BACKGROUND ART

The development of electronic technology in recent years is remarkable, and various apparatus and devices have been reduced in size and weight. Accompanying the reduction in size and weight of such electronic apparatus and devices, there has been a remarkably increasing demand for reduction in size and weight of a battery as a power supply for such electronic apparatus and devices. In order to generate a larger energy from a battery of small volume and weight, it is desirable to generate a higher voltage from one battery. From this viewpoint, much attention has been called to a battery using a negative electrode substance comprising, e.g., lithium or a carbonaceous material capable of being doped with lithium ions, and a positive electrode active substance comprising, e.g., a lithium-cobalt oxide.

However, in case where an aqueous electrolytic solution is used, it is easily decomposed in contact with lithium, a carbonaceous material doped with lithium ions or a lithium aluminum alloy, so that a non-aqueous electrolytic solution formed by dissolving a lithium salt in an organic solvent has been used as the electrolytic solution. As the electrolyte for such a non-aqueous electrolytic solution, there are known $LiPF_6$, $LiAsF_6$, $LiClO_4$, $LiBF_4$, $LiCH_3SO_3$, $LiCF_3SO_3$, $LiN(CF_3SO_2)_2$, $LiC(CF_3SO_2)_3$, LiCl, LiBr, etc. Further, as the organic solvent for the electrolyte, there is principally used a solvent mixture of a solvent having a high dielectric constant and well dissolving the electrolyte, such as propylene carbonate, ethylene carbonate or γ-butyrolactone, and a low-boiling point solvent, such as 1,2-dimethoxyethane, 1,2-diethoxyethane, dimethyl carbonate, diethyl carbonate, methyl ethyl carbonate, methyl propionate or ethyl propionate. The solvent having a high dielectric constant generally has a high boiling point of ca. 200° C. or higher and a low vapor pressure at ordinary temperature, whereas most low viscosity solvents generally have a boiling point around ca. 100° C. and a high vapor pressure at ordinary temperature.

On the other hand, in case where such a non-aqueous secondary battery filled with an organic electrolytic solution is exposed to a high temperature causing a very high vapor pressure of the electrolytic solution inside thereof or excessively charged to generate a decomposition gas of the electrolytic solution, a dangerous state of causing an increase in battery internal pressure possibly leading to an explosion is expected. For this reason, currently commercially available non-aqueous secondary batteries are equipped with a rupture plate for releasing an excessively high pressure before explosion of the battery per se. The operation of the rupture plate results in leakage of a readily ignitable organic electrolytic solution outside the battery. Such leakage of the electrolyte may presumably be also caused by a deterioration with time of a packing between the can body and the cap or a deformation of the packing due to careless handling of the battery. Accordingly, a battery using a non-aqueous electrolyte involves a potential risk of a fire in case of leakage of the non-aqueous electrolytic solution outside the battery by any chance due to a high pressure and ready ignitability of the electrolytic solution.

Non-aqueous lithium-based secondary batteries have been heretofore principally used as power sources for home-use small-capacity electronic appliances, such as portable telephone sets, personal computers and video camera-covers. Heretofore, no fire accident has been caused at all on the market in ordinary environments of use, and general understanding has been attained regarding the safeness of secondary batteries. Accordingly, based on such actual results of safety, the development of secondary batteries as large electricity sources, such as those for electromotive vehicles and load leveling for effective utilization of night electricity, has recently become earnest. As the batteries become larger, the risk of an accidental fire becomes larger to an extent beyond comparison with that in the case of small-capacity batteries.

The present inventors have studied for improvement of problems regarding the safeness of a secondary battery, while noting that such problems are attributable to the use of an organic solvent, particularly a low-viscosity solvent having a high vapor pressure at low temperatures and the structure wherein the organic electrolytic solution is readily leaked out on an occasion of mal-function of the packing of the battery caused by any chance. Accordingly, it has been considered essential to use solid polymer electrolytes, inclusive of, e.g., one formed by dispersing a lithium electrolyte, such as $LiClO_4$ or $LiPF_6$ in a gel-form substance composed of polyethylene oxide as a polymer and propylene carbonate as a highly dielectric solvent, developed since 1970's. Several solid polymer electrolytes have been reportedly developed, and actually primary batteries using them have been commercialized. However, no secondary batteries having a cycle characteristic of more than several hundred cycles, have been realized. One cause thereof may be the reduction of the polymer matrix substance used for the solid electrolyte at the boundary with a negative electrode of lithium metal or doped with lithium resulting in a growth of a passive state film showing a poor conductivity for lithium ions. Another cause may be the use of a solid polymer electrolyte showing a lower conductivity for lithium ions than a conventional electrolytic solution using an organic solvent, thus resulting in a battery having a high internal resistance, whereby the utilization of a full capacity of the electrode active substance is liable to cause excessive charging and excessive discharging, thus leading to a deterioration of the electrode active substance in a short period.

By the way, vinylidene fluoride polymer is currently extensively used as a binder for binding an electrode active substance in small-capacity lithium ion secondary batteries using non-aqueous electrolytic solutions. This is because the vinylidene fluoride polymer is not at all reduced in a reducing atmosphere on a negative electrode where tetrafluoroethylene polymer is readily reduced, or is not at all oxidized in an oxidizing atmosphere on a positive electrode where most organic electrolytic solutions are oxidized, so that it is electrochemically stable over a wide potential window.

Further, vinylidene fluoride monomer has two hydrogen atoms functioning as electron donors, and two fluorine atoms functioning as electron acceptors, and therefore has a high polarization as a monomer unit so that it functions as a medium capable of well dissolving therein polar substance, such as an electrolyte.

As has been clarified in Japanese Patent Publication (JP-B) 54-044220, it is known that even a macromolecule such as an organic dye molecule can be migrated at a high speed within a polymer at room temperature if the polymer has a low glass transition temperature. Vinylidene fluoride polymer has a glass transition temperature as low as −45° C., which means that room temperature is higher than its glass transition temperature by more than 50° C., so that the molecular movement at an amorphous portion thereof is sufficiently active and it is considered to exhibit a capability of transporting an electrolyte contained therein at a high speed.

For the above-mentioned reasons in combination, vinylidene fluoride polymer is considered to be extensively used as a binder which is required to satisfy mutually contradictory properties that it encloses an electrode active substance and it is free from obstruction of transportation of lithium ions to the interior of the active substance.

In view of the above, it may well be expected to use vinylidene fluoride polymer for constituting a basic matrix of a solid polymer electrolyte. This has been already reported in Japan in early 1980's, regarding a solid polymer electrolyte using vinylidene fluoride polymer (Tsuchida, E., et al.; Electrochimica Acta. 28 (5), 591–595 (1983)).

However, vinylidene fluoride polymer is a crystalline polymer having a crystallinity of ca. 50%, so that the ionic conductivity at a crystalline portion is considered to be very low because of extremely poor molecular mobility at a crystalline portion of a polymer. For this reason, in 1990's, a solid polymer electrolyte using a copolymer of vinylidene fluoride and hexafluoropropylene having a lower crystallinity has been reported as disclosed in U.S. Pat. No. 5,296,318. The vinylidene fluoride copolymer copolymerized with 8 wt. % or more of hexafluoropropylene has a very low crystallinity because trifluoromethyl groups in the hexafluoropropylene provide steric hindrance, so that it is considered to have provided a higher ionic conductivity than in the one using vinylidene fluoride homopolymer.

However, it has become clear that the solid polymer electrolyte using vinylidene fluoride-hexafluoropropylene copolymer involves a serious defect for practical use. More specifically, when a gel is formed as a mixture thereof with an organic solvent to be used as a material for a secondary battery, the gel exhibits insufficient adhesiveness onto an electrode substrate as represented by a copper foil (for a negative electrode) or an aluminum foil (for a positive electrode), thus being liable to result in a peeling of the gel layer containing powdery electrode materials, such as an active substance, leading to practical problems, such as a lowering in production yield during battery assembling steps and a lowering with time of discharge capacity of a battery during a long period of use of the battery.

When the adhesiveness of a gel electrode swollen with an electrolytic liquid onto a smooth surface like that of a metal foil is considered, the electrolytic liquid contained in the gel inevitably obstructs the chemical interaction between the gel and the electrode substrate to result in a lower adhesion in case of using such a copolymer. On the other hand, there has been proposed an idea of providing unevennesses to an electroconductive substrate surface by etching, etc., so as to physically bond the gel due to the anchoring effect. This requires a troublesome surface treatment of the electroconductive substrate and yet cannot necessarily fulfill a sufficient effect as expected.

DISCLOSURE OF INVENTION

A principal object of the present invention is to provide a vinylidene fluoride copolymer suitable for forming a polymer matrix providing a solid polymer electrolyte which exhibits an appropriate level of ionic conductivity in its state of being swollen with a non-aqueous electrolytic solution, excellent adhesion to an electroconductive substrate and retentivity of powdery electrode materials, and further excellent heat resistance.

Another object of the present invention is to provide a solid polymer electrolyte formed by using such a vinylidene fluoride copolymer and a non-aqueous battery using the solid polymer electrolyte.

According to the inventors study, it has been found very effective for accomplishing the above objects to use a vinylidene fluoride copolymer having a moderately reduced vinylidene fluoride content and an increased amorphous content, having an appropriate polar group introduced by copolymerization and having been crosslinked.

Thus, according to a first aspect thereof, the present invention provides a vinylidene fluoride copolymer comprising 50–97 mol. % of vinylidene fluoride monomer, and 0.1–5 mol. % of a monoester of unsaturated dibasic acid or an epoxy group-containing vinyl monomer, and having been chemically or physically crosslinked.

The improved adhesion with the electroconductive substrate and retentivity of powdery electrode materials are considered to have been attained by the introduction of a polar group comprising the acid or epoxy group and a rubbery characteristic caused by an increased amorphous portion due to a lower vinylidene fluoride content.

Further, the solid polymer electrolyte of the present invention is characterized by comprising a polymer matrix comprising the above-mentioned vinylidene fluoride copolymer, and a non-aqueous electrolytic solution impregnating the polymer matrix.

The present invention further provides a solid polymer electrolyte for forming a secondary battery equipped with a positive electrode comprising a positive electrode material capable of being doped with and liberating lithium, and a negative electrode comprising a negative electrode material capable of similarly being doped with and liberating lithium, wherein an electrode structure is formed by binding and retaining a powdery electrode material for constituting the positive electrode or the negative electrode with the above-mentioned crosslinked vinylidene fluoride copolymer and is impregnated with a non-aqueous electrolytic solution to render the vinylidene fluoride copolymer to be a gel-form solid electrolyte so as to form an electrode structure integral with the powdery electrode material.

The present invention further provides a non-aqueous battery comprising a positive electrode, a negative electrode, and any solid polymer electrolyte mentioned above disposed between the positive and negative electrodes.

More specifically, a solid polymer electrolyte formed by impregnating the polymer matrix comprising the above-mentioned crosslinked vinylidene fluoride copolymer and containing substantially no powdery electrode material, when placed between a pair of the positive electrode and the negative electrode, functions as both an electrolytic solution and a separator.

Further, a solid polymer electrolyte layer formed by dispersing a positive electrode material or a negative material in the solid polymer electrolyte functions as a positive electrode layer or a negative electrode layer, respectively.

Then, a non-aqueous battery according to the present invention may be formed by disposing the polymeric solid electrode layer functioning as a separator sandwiched between the solid polymer electrolyte layers as a positive electrode layer and a negative electrode layer respectively bonded to electroconductive substrates. The solid polymer electrolyte constituting the positive electrode layer and the negative electrode layer, and the solid polymer electrolyte also functioning as a separator, are all formed of gels, so that they exhibit a good adhesion with each other and provide a structure of laminated layers which are not readily peeled from each other.

Further, it is also possible to use such positive and negative electrode structures comprising the gel-form solid electrolytes in a conventional battery using a non-aqueous electrolytic solution and a separator and not using such a solid polymer electrolyte layer comprising a polymer retaining a non-aqueous electrolytic solution.

EMBODIMENTS OF THE INVENTION

The solid electrolyte-forming vinylidene fluoride copolymer of the present invention is a vinylidene fluoride copolymer which comprises 50–97 mol. % of vinylidene fluoride monomer, and 0.1–5 mol. % of a monoester of unsaturated dibasic acid or an epoxy group-containing vinyl monomer and is further crosslinked. The unsaturated dibasic acid monoesters may be those having 5–8 carbon atoms, and examples thereof may include: monomethyl maleate, monoethyl maleate, monomethyl citraconate, and monoethyl citraconate. Monomethyl maleate and monomethyl citraconate are particularly preferred. The epoxy group-containing vinyl monomers may include: allylglycidyl ether, methallyl glycidyl ether, vinyl glycidyl ether, and crotonic acid glycidyl ether. Allyl glycidyl ether is particularly preferred.

In order to retain the excellent anti-oxidation and reduction characteristic of vinylidene fluoride, the vinylidene fluoride copolymer may preferably contain as much vinylidene fluoride polymerized units as possible and is required to contain at least 50 mol. % thereof. Further, in order to provide the resultant solid electrolyte with an enhanced ionic conductivity, the vinylidene fluoride copolymer may preferably contain as much monomer other than vinylidene fluoride as possible and is required to contain at most 97 mol. % of vinylidene fluoride monomer. Further, the content of the unsaturated dibasic acid monoester or the epoxy group-containing vinyl monomer must be at least 0.1 mol. % and at most 5 mol. % in the copolymer in order to impart the adhesiveness. The content in excess of 5 mol. % results in worse copolymerizability and requires an extremely long polymerization period, thus being unpractical.

Provided that the prescribed compositional conditions are satisfied, the vinylidene fluoride copolymer of the present invention can be composed of only the vinylidene fluoride and the unsaturated dibasic acid monoester or epoxy group-containing vinyl monomer, but may more preferably be composed as a copolymer further including a fluorine-containing monomer having good copolymerizability with vinylidene fluoride, such as monofluoroethylene, trifluoroethylene, tetrafluoroethylene, trifluoromonochloroethylene or hexafluoropropylene, so as to more effectively lower the crystallinity and increase the amorphous portion thereby increasing the ionic conductivity, without excessively increasing the solubility in a non-aqueous electrolytic solution.

In order to provide a good thermal resistance, the vinylidene fluoride copolymer may preferably have a relatively high molecular weight, and more specifically, an inherent viscosity (i.e., a logarithmic viscosity at 30° C. of a solution formed by dissolving 4 g of a resin in 1 liter of N,N-dimethylformamide, herein) of 0.5–10.0, particularly 0.8–7.0.

The vinylidene fluoride copolymer may be used alone or in mixture with another polymer matrix-forming resin, but may preferably occupy at least 50 wt. % of the resultant polymer matrix. Examples of such another resin may include: polymers conventionally used as polymeric solid electrolytics, such as vinylidene fluoride homopolymer, copolymers with monomers different from the above-mentioned vinylidene fluoride copolymers, polyethylene oxide, polyacrylonitrile and polymethyl methacrylate, and oligomers thereof.

The non-aqueous electrolytic solution forming the solid electrolyte of the present invention together with the above-mentioned polymer matrix may for example be formed by dissolving 5–30 wt. parts of an electrolyte, such as a lithium salt, in 100 wt. parts of a non-aqueous solvent (organic solvent).

The electrolytes may include $LiAsF_6$, $LiClO_4$, $LiBF_4$, $LiCl$, $LiBr$, $LiCH_3SO_3$, $LiFD_3SO_3$, $LiN(CF_3OSO_2)_2$, $LiC(CF_3OSO_2)_3$, $LiN(CF_3SO_2)_2$, $LiC(CF_3SO_2)_3$, etc. Further, the organic solvents for the electrolytes may include: propylene carbonate, ethylene carbonate, 1,2-dimethoxyethane, 1,2-diethoxyethane, dimethyl carbonate, diethyl carbonate, methyl ethyl carbonate, γ-butyrolactone, methyl propionate, ethyl propionate, diethylene glycol dimethyl ether, and mixture solvents of these, etc., but these are not restrictive.

Figure 1:
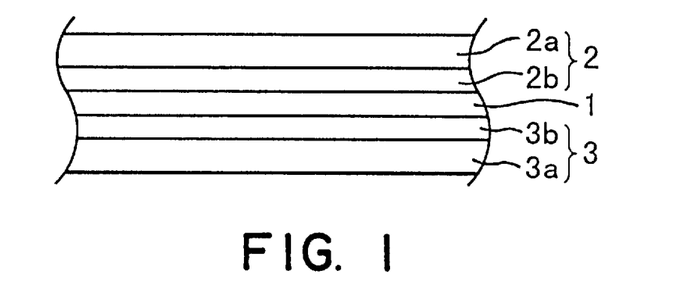
FIG. 1 is a thickness-wise sectional view showing a basic laminate structure of a non-aqueous battery according to the invention.
Figure 2:
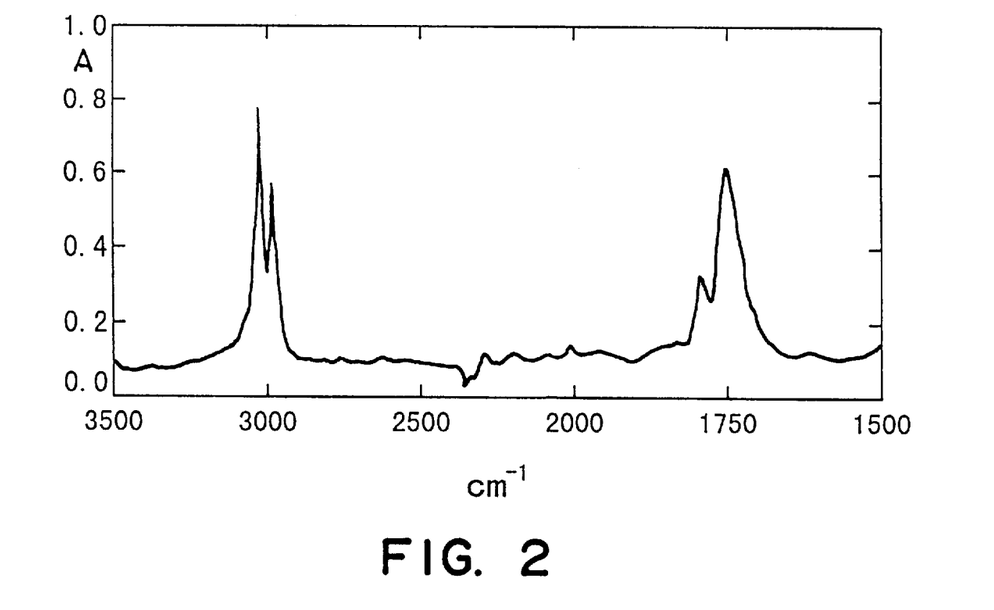
FIG. 2 is an FT-IR chart of vinylidene fluoride copolymer obtained in Reference Example 1.
Figure 3:
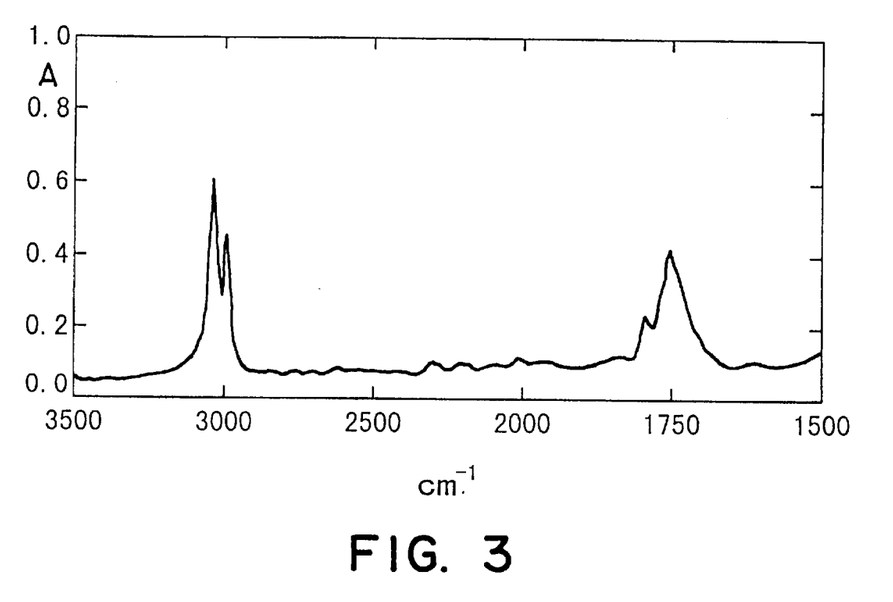
FIG. 3 is an FT-IR chart of vinylidene fluoride copolymer obtained in Reference Example 3.
Figure 4:
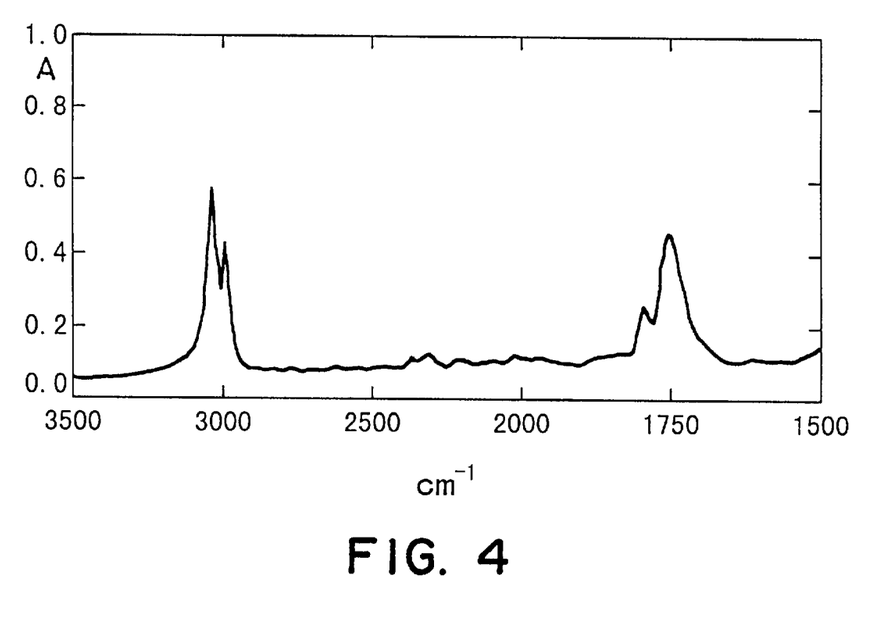
FIG. 4 is an FT-IR chart of vinylidene fluoride copolymer obtained in Reference Example 4.
Figure 5:
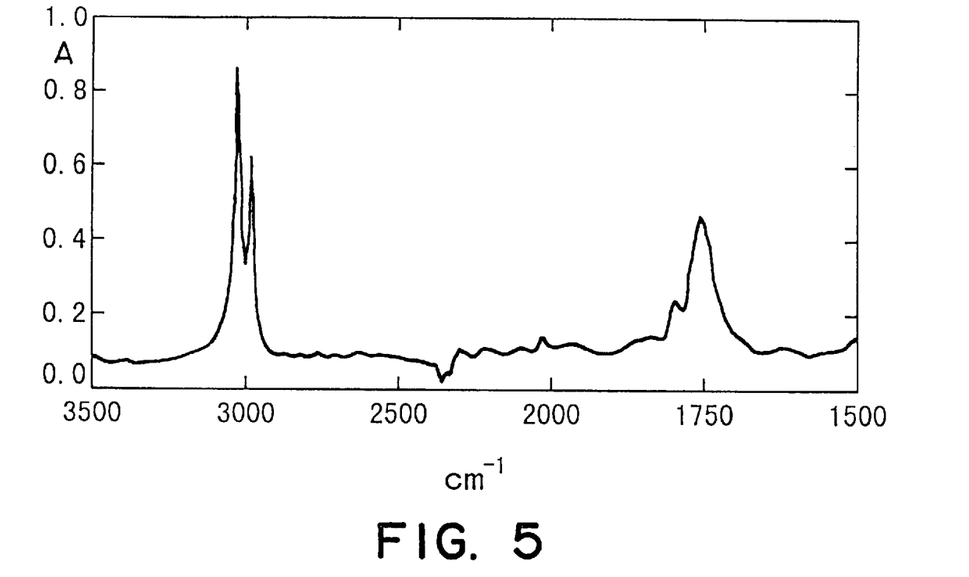
FIG. 5 is an FT-IR chart of vinylidene fluoride copolymer obtained in Comparative Example 2.

As shown in a sectional view of FIG. 1, a basic structure of non-aqueous battery according to the present invention, may be obtained by disposing a generally sheet-form solid electrolyte 1 in a sandwiched form between a pair of a positive electrode 2 (2a: electroconductive substrate, 2b: positive composite electrode layer) and a negative electrode 3 (3a: electroconductive substrate, 3b: negative composite electrode layer) comprising similar solid electrolytes.

Thus, the solid electrolyte of the present invention may be used to constitute structures of the positive compositive electrode layer 2a and the negative compositive electrode layer 2b each retaining an electrode active substance and a non-aqueous electrolytic solution, and further the gel layer 1 sandwiched between these two electrode layers. The positive composite electrode layer 2b and the negative composite electrode layer 3b may for example be formed in the following manner. First, the above-mentioned vinylidene fluoride copolymer (or a mixture thereof with another resin) is blended with an organic solvent and powdery electrode material to form a slurry, which is then applied onto an electroconductive substrate 2a or 3a. Then, the organic solvent is removed by drying, and the resultant electrode structure is dipped in an electrolytic solution to be impregnated with the electrolytic solution to obtain a positive electrode 2 or a negative electrode 3. The organic solvent used in the above may preferably be a polar one, and examples thereof may include: N-methyl-2-pyrrolidone, dimethylformamide, N,N-dimethylacetamide, 1,4-dioxane, tetrahydrofuran, tetramethylurea, triethy phosphate, and trimethyl phosphate. These solvents may be used singly or in mixture of two or more species. It is preferred to use the above-mentioned copolymer in a proportion of 0.1–30 wt. parts, particularly 1–25 wt. parts, per 100 wt. parts of the organic solvent. The time for impregnation of the electrode structure within the electrolytic solution may sufficiently be several hours, and a longer time does not result in a different effect.

The gel layer 1 sandwiched between the positive electrode 2—the negative electrode 3 may for example be formed from the vinylidene fluoride copolymer (or a mixture thereof with another resin) and an electrolytic solution in the following manner. First, an electrolyte is dissolved in an organic solvent to form a non-aqueous electrolytic solution in a manner as described above. Then, the vinylidene fluoride resin is dissolved in a volatile organic solvent to form a solution, which is then uniformly blended with the above electrolytic solution. Further, the volatile organic solvent is vaporized to obtain a solid polymer electrolyte in a film form. The volatile organic solvent used in the above may preferably be one well dissolving the vinylidene fluoride copolymer. Tetrahydrofuran, methyltetrahydrofran, acetone, methyl ethyl ketone, 1,3-dioxalane, cyclohexanone, etc., may be used, but these are not restrictive.

Incidentally, propylene carbonate which is an organic solvent frequently used for dissolving an electrolyte, for example, can also be used as a solvent for a vinylidene fluoride copolymer, so that it is usable for providing a solid polymer electrolyte without using a volatile organic solvent. In this case, it is possible to first dissolve vinylidene fluoride copolymer in such an organic solvent to form a solution and further add and dissolve an electrolyte therein, or to dissolve the vinylidene fluoride copolymer and the electrolyte simultaneously in such an organic solvent. The solution containing the vinylidene fluoride copolymer and the electrolyte dissolved therein may be cooled to room temperature to cause gelation, thereby forming a film structure 1 comprising a solid polymer electrolyte.

Further, it is also possible to form a film of the vinylidene fluoride copolymer and then impregnate the film with an electrolytic solution to form a solid polymer electrolyte. As a means for film formation in a small amount, it is possible to suitably use a solvent casting process wherein a solution of the vinylidene fluoride copolymer in an organic solvent, such as tetrahydrofuran, as mentioned above, is cast onto a glass sheet, etc., followed by vaporization of the solvent. As a means for mass production of films, it is possible to suitably adopt ordinary film forming processes, such as the inflation process, the T-die extrusion process and the calendering process. At the time of such film formation, it is also possible and suitable to add also a crosslinking agent and effect the film formation under exposure to radiation or heating for promoting the crosslinking reaction. Incidentally, the sequence of impregnation after crosslinking may generally provide an increased crosslinking efficiency because an unnecessary side reaction can be suppressed due to the absence of the electrolytic solution at the time of crosslinking.

In the case of a lithium ion battery taken for example, the solid electrolyte gel layer 1 may preferably have a thickness of 0.002–1.000 mm, particularly 0.010–0.200 mm, and it is preferred to use a non-aqueous electrolytic solution for impregnation in a proportion of 10–1000 wt. parts, particularly 100–500 wt. parts, for 100 wt. parts of the vinylidene fluoride copolymer.

On the other hand, the positive electrode 2 and the negative electrode 3 may be obtained by forming a positive composite electrode layer 2b and a negative composite electrode layer 3b in thicknesses of, e.g., 0.010–1.000 mm on, e.g., one surface each of electroconductive substrates 2a and 3a comprising a metal foil or metal net comprising iron, stainless steel, copper, aluminum, nickel, titanium, etc. in thicknesses of 0.005–1.000 mm, e.g., 0.005–0.020 mm in case of small-sized devices, and impregnating the composite electrode layers 2b and 3b with an electrolytic solution.

The positive and negative composite electrode layers 2b and 3b may be obtained by applying and drying an electrode-forming slurry composition formed, e.g., by dispersing 1–20 wt. parts of powdery electrode materials (positive or negative electrode active substance, and optionally added electroconductivity imparting agent and other additives) in 100 wt. parts of a solution of the above-mentioned vinylidene fluoride copolymer and electrolytic solution in a volatile organic solvent.

Preferred active substances for lithium ion secondary batteries may include: for positive electrodes, complex metal chalogenides represented by a general formula of $LiMY_2$ (wherein M denotes at least one species of transition metals, such as Co, Ni, Fe, Mn, Cr and V; and Y denotes a chalcogen such as O or S), particularly complex metal oxides as represented by $LiNi_xCo_{1-x}O_2$ ($0 \leq x \leq 1$) and complex metal oxides having a spinel structure, such as $LiMn_2O_4$.

Active substances for negative electrodes may include: carbonaceous materials, such as graphite, activated carbon, calcined and carbonized products of phenolic resin and pitch, and coconut shell-based activated carbon, and metal oxides, such as GeO, $GeO_2$, SnO, $SnO_2$, PbO, $PbO_2$, SiO, $SiO_2$, etc., and complex metal oxides of these.

In the present invention, the vinylidene fluoride copolymer constituting at least one of the solid polymer electrolytes of the layers 1, 2b and 3b is positively crosslinked to suppress the dissolution of the vinylidene fluoride copolymer in the non-aqueous electrolytic solution and retain a gel state with an appropriate degree of swelling. This is effective for allowing the use of the battery at higher temperatures and for providing the battery with an improved heat resistance. For the crosslinking, it is possible to suitably adopt a chemical means, such as the addition of a polyamine, a polyol, or a polymerizable crosslinking agent having an unsaturated bond and a radical generator, or a physical means, such as irradiation with electron beam or γ-rays. The chlorine-substituted site of trifluoromonochloroethylene readily causes de-chlorination in the presence of an alkaline substance, such as an amine, so that it provides a copolymer suitable for promotion of the crosslinking. Further, it has been found that the crosslinking speed is remarkably accelerated by adding a powder of carbon black, graphite, silica gel, Florisil, etc. It is preferred that the crosslinking is effected in such a degree as to provide the resultant solid polymer electrolyte with a shape-retaining property durable at a temperature of at least 80° C., preferably at least 100° C., and the gel-form solid electrolyte impregnated with an electrolytic solution with a heat-resistance free from melting at a temperature of at least 80° C., preferably at least 100° C.

The crosslinking of the copolymer can be effected in any state, i.e., any of a dry film or a film containing the electrolytic solution of the copolymer, a solution of the copolymer in an organic solvent, and a composition comprising the copolymer and the electrode active substance.

The step of impregnating the copolymer with an electrolytic solution to form a gel for the formation of the positive electrode layer 2b and the negative electrode 3b may be performed simultaneously with the formation of the electrode layer containing the active substance and electroconductivity-imparting agent, or effected by impregnating the already formed electrode layer with the electrolytic solution.

Suitable examples of the polyamine used for chemical crosslinking may include dibutylamine, piperidine, diethylcyclohexylamine, hexamethylenediamine, hexamethylenediamine carbamate, N,N'-dicinnamilidene-1,6-hexanediamine, and 4,4'-bis(aminocyclohexyl)metacarbamate, but these are not restrictive.

Suitable examples of the polyol may include 2,2-bis(4-hydroxyphenyl)propane, 2,2-bis(4-hydroxyphenyl)hexafluoropropane, hydroquinone, and 4,4'-dihydroxydiphenylmethane, but these are not restrictive.

Suitable examples of the polymerizable crosslinking agent having an unsaturated bond may include: divinylbenzene, ethylene glycol dimethacrylate, triethylene glycol dimethacrylate, tetraethylene glycol dimethacrylate, 1,3-butylene glycol dimethacrylate, propylene glycol dimethacrylate, 1,4-butanediol dimethacrylate, 1,6-hexanediol dimethacrylate, neopentyl glycol dimethacrylate, allyl methacrylate, allyl acrylate, 2-hydroxy-1,3-dimethacryloxypropane, bisphenol dimethacrylates, alicyclic dimethacrylates, diacryl isocyanurate, trimethylolpropane trimethacrylate, triacrylformal, triacryl isocyanurate, triallyl isocyanurate, aliphatic triacrylates, pentaerythritol tetramethacrylate, pentaerythritol tetraacrylate, and aliphatic tetraacrylates, but these are not restrictive.

As the radical generator, various organic peroxides may be used including, as suitable examples, dialkyl peroxides, such as di-t-butyl peroxide; diacyl peroxides, such as benzoyl peroxide; peroxyketals, such as 2,5-dimethyl-di(t-butylperoxy)hexane; and di-n-peroxydicarbonates, but these are not restrictive.

Further, in addition to the above-mentioned polyamine, polyol, polymerizable crosslinking agent and radical generator, it is also possible to add, as a vulcanization accelerator, a compound which promotes the defluorination of vinylidene fluoride but per se is not readily added. Examples of the vulcanization accelerator may include organic phosphonium salts and quaternary ammonium salts represented by $R_4P^+X^-$ and $R_4N^+X^-$.

The solid polymer electrolyte of the present invention can also be used as a binder for an active substance of a positive electrode or a negative electrode. In this instance, in order to provide an electronic conductivity, there may be added electroconductivity-imparting agents, inclusive of a carbonaceous material, such as carbon black, or graphite fine powder or fiber; fine powder of a metal, such as nickel or aluminum. The electroconductivity-imparting agent can also be used as an acid receptor (i.e., a receptor of an acidic substance, such as fluoric acid, occurring during the vulcanization), and it is assumed that faster gelation in the presence of carbon black than graphite fine powder is attributable to the function of carbon black as an acid receptor. Conventional acid receptors, such as magnesium oxide, lead oxide, calcium oxide, silicon oxide and tin oxide, may not be suitably used because they possibly exert adverse effects on battery performances by trapping lithium ions inside the battery. Carbon black may suitably be added in 0.1–50 wt. % of the vinylidene fluoride copolymer.

As another method of crosslinking the solid polymer electrolyte, the irradiation with electron beam or γ-rays may suitably be adopted for introducing the crosslinking structure. The radiation dose in this instance may suitably be on the order of 10–500 kGy. In order to enhance the radiation crosslinking effect, it is also suitable to add a polymerizable crosslinking agent having an unsaturated bond as mentioned above in the solid polymer electrolyte in advance.

The thus-formed laminated sheet-form battery structure shown in FIG. 1 may be, as desired, further laminated as by winding or folding to provide an increased electrode area per unit volume, and subjected to a treatment, such as enclosure within a relatively simply container and formation of lead electrodes, to provide a non-aqueous battery having an entire structure of, e.g., a rectangle, a cylinder, a coin or a paper-sheet.

EXAMPLES

Hereinbelow, the present invention will be described more specifically with reference to drawings, Reference Examples, Examples and Comparative Examples.

Preparation of Vinylidene Fluoride Copolymers

Reference Example 1

Into an autoclave having an inner volume of liter, 1036 g of deionized water, 0.80 g of methyl cellulose, 3.6 g of diisopropyl peroxydicarbonate, 3.6 g of flon 225cb, 8.0 g of monomethyl maleate, 372 g of vinylidene fluoride and 28 g of hexafluoropropylene were charged and subjected to 86 hours of suspension polymerization at 28° C. After completion of the polymerization, the polymerizate slurry was dewatered, washed with water and dried at 80° C. for 20 hours to obtain a polymer powder. The polymerization yield was 80 wt. %, and the obtained polymer showed an inherent viscosity of 1.24.

Reference Example 2

Into an autoclave having an inner volume of 2 liter, 1036 g of deionized water, 0.80 g of methyl cellulose, 3.6 g of diisopropyl peroxydicarbonate, 3.6 g of flon 225cb, 4.0 g of allyl glycidyl ether, 372 g of vinylidene fluoride and 4.0 g of trifluoromonochloroethylene were charged, and from a time of 2 hours after initiation of polymerization, 24 g of trifluoromonochloroethylene was added in division of 1.0 g each at an interval of 1 hour, to complete 60 hours of suspension polymerization at 25° C. After completion of the polymerization, the polymerizate slurry was dewatered, washed with water and dried at 80° C. for 20 hours to obtain a polymer powder. The polymerization yield was 75 wt. %, and the obtained polymer showed an inherent viscosity of 1.03.

Comparative Example 1

Into an autoclave having an inner volume of 2 liter, 1176 g of deionized water, 0.3 g of methyl cellulose, 3.3 g of dinormalpropyl peroxydicarbonate, 552 g of vinylidene fluoride and 47 g of hexafluoropropylene were charged and subjected to 16.5 hours of suspension polymerization at 28° C. After completion of the polymerization, the polymerizate slurry was dewatered, washed with water and dried at 80° C. for 20 hours to obtain a polymer powder. The polymerization yield was 80 wt. %, and the obtained polymer showed an inherent viscosity of 1.41.

Reference Example 3

Into an autoclave having an inner volume of 2 liter, 1036 g of deionized water, 0.80 g of methyl cellulose, 2.8 g of diisopropyl peroxydicarbonate, 2.8 g of flon 225cb, 104 g of hexafluoropropylene, 4.0 g of monomethyl maleate, and 296 g of vinylidene fluoride were charged and subjected to 64.5 hours of suspension polymerization at 28° C. After completion of the polymerization, the polymerizate slurry was dewatered, washed with water and dried at 80° C. for 20 hours to obtain a polymer powder. The polymerization yield was 80 wt. %, and the obtained polymer showed an inherent viscosity of 1.13.

Reference Example 4

Into an autoclave having an inner volume of 2 liter, 1036 g of deionized water, 0.80 g of methyl cellulose, 3.6 g of diisopropyl peroxydicarbonate, 3.6 g of flon 225cb, 64 g of hexafluoropropylene, 4.0 g of monomethyl maleate, and 336 g of vinylidene fluoride were charged and subjected to 54.5 hours of suspension polymerization at 28° C. After completion of the polymerization, the polymerizate slurry was dewatered, washed with water and dried at 80° C. for 20 hours to obtain a polymer powder. The polymerization yield was 80 wt. %, and the obtained polymer showed an inherent viscosity of 1.13.

Comparative Example 2

Into an autoclave having an inner volume of 2 liter, 1040 g of deionized water, 0.80 g of methyl cellulose, 2.5 g of ethyl acetate, 4 g of diisopropyl peroxydicarbonate, 4.0 g of monomethyl maleate, and 396 g of vinylidene fluoride were charged and subjected to 47 hours of suspension polymerization at 28° C. After completion of the polymerization, the polymerizate slurry was dewatered, washed with water and dried at 80° C. for 20 hours to obtain a polymer powder. The polymerization yield was 80 wt. %, and the obtained polymer showed an inherent viscosity of 1.13.

Figure 6:
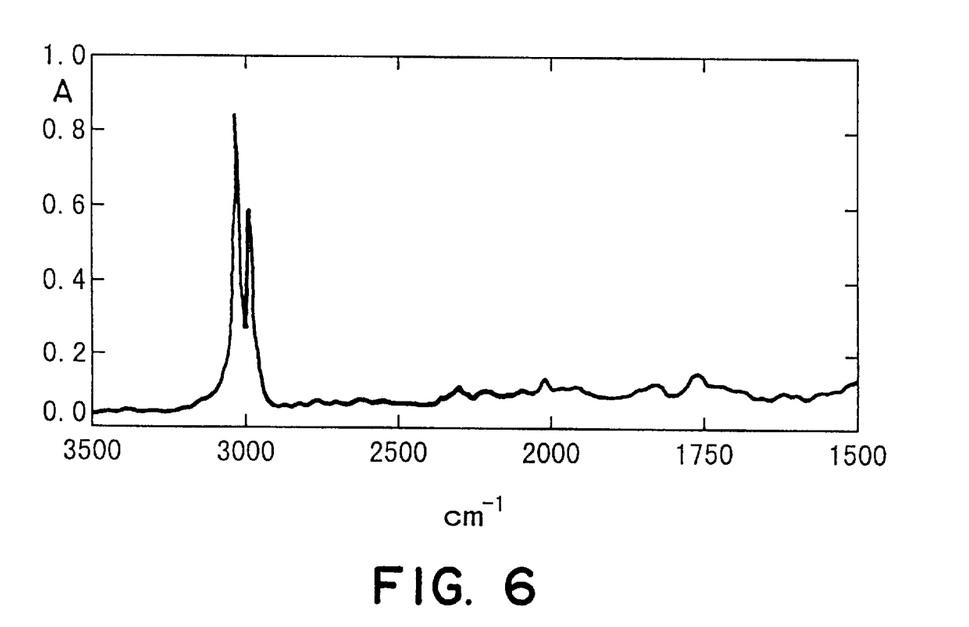
FIG. 6 is an FT-IR chart of commercially available vinylidene fluoride homopolymer.

FT-IR charts of the vinylidene fluoride copolymers obtained in Reference Examples 1, 3 and 4 and Comparative Example 2 are attached hereto as FIGS. 2–5, respectively. Compared with FIG. 6 that is an FT-IR chart of a vinylidene fluoride homopolymer (Kureha "KF Polymer #1100"), absorption peaks around a wave number 1750 $cm^{-1}$ corresponding to stretching vibration of C=O in the introduced carboxyl group are clearly shown. From a comparison of the peaks with an absorption peak at 3025 $cm^{-1}$ or 2983 $cm^{-1}$ corresponding to stretching vibration of CH, the carboxylic acid contents can be roughly estimated.

Preparation of Solid Polymer Electrolyte Films

Each in 15 g of the vinylidene fluoride copolymers prepared in the above Reference Examples and Comparative Examples was dissolved in 90 g of tetrahydrofuran to prepare a first solution. Then, 1.5 g of $LiPF_6$ was dissolved in 10 ml of propylene carbonate to prepare a second solution. The first solution and the second solution were blended and well stirred with each other and then cast onto a glass sheet, followed by standing for 1 hour at room temperature so as to evaporate the tetrahydrofuran. The above operation was performed under a stream of nitrogen having a due point of at most −70° C. so as to prevent the electrolyte from decomposition due to moisture, etc. The resultant ca. 80 $\mu$m-thick gel-form solid electrolyte film was weighed, whereby a weight loss corresponding to the tetrahydrofuran was confirmed.

Preparation of Chemically Crosslinked Solid Polymer Electrolyte Films: Examples 1A–3A Each in 10 g of the vinylidene fluoride copolymers obtained in Reference Examples 1–3 was dissolved in 90 g of tetrahydrofuran, and 1.5 g of hexamethylenediamine as a crosslinking agent and 0.6 g of diethylamine as an accelerator were added thereto to prepare a first solution. Then, 4.5 g of $LiPF_6$ was dissolved in 30 ml of propylene carbonate to prepare a second solution. The first solution and the second solution were blended and well stirred for 12 hour at room temperature, and then cast onto a glass sheet, followed by standing still at 50° C. for 1 hour for evaporation of the tetrahydrofuran. The resultant ca. 80 $\mu$m-thick gel-form solid electrolyte film was weighed, whereby a weight loss corresponding to the used tetrahydrofuran was confirmed.

Preparation of Physically Crosslinked Solid Polymer Electrolyte Films: Examples 1B–3B Each in 10 g of the vinylidene floride copolymers obtained in Reference Examples 1–3 was dissolved in 90 g of tetrahydrofuran, and 1.0 g of triallyl isocyanurate as a crosslinking agent was added thereto to prepare a first solution. Then, 6 g of $LiPF_6$ was dissolved in 30 ml of propylene carbonate to prepare a second solution. The first solution was cast onto a glass sheet, followed by standing still at room temperature for 1 hour for evaporation of the tetrahydrofuran. The resultant ca. 30 $\mu$m-thick cast film was weighed, whereby a weight loss corresponding to the used tetrahydrofuran was confirmed. The cast film was then irradiated with γ-rays at a dose of 50 kGy to effect crosslinking. Then, the thus-crosslinked cast film was dipped in the second solution and held at 80° C. for 2 hours to obtain a ca. 100 $\mu$m-thick gel-form solid electrolyte film impregnated with the electrolytic solution.

Preparation of Negative Electrode Structures

Each in 10 g of the vinylidene fluoride copolymers obtained in the above Reference Examples and Comparative Examples was blended with 90 g of a pitch-origin porous carbon material ("Carboron P", mfd. by Kureha Kagaku Kogyo K.K.) and 90 g of N-methyl-2-pyrolidone. The resultant slurry was applied onto a 0.010 mm-thick copper foil and dried at 130° C. to evaporate the N-methyl-2-pyrrolidone, thereby obtaining a dry electrode. Then, the dry electrode was dipped in a solution (electrolytic solution) of 1.5 g of $LiPF_6$ dissolved in 10 ml of propylene carbonate at room temperature for 3 hours, and taken out of the solution to prepare a negative electrode structure.

Preparation of Chemically Crosslinked Negative Electrode Structures: Examples 1A–2A Each in 10 g of the vinylidene fluoride copolymers obtained in the above Reference Examples 1–2 was dissolved together with 80 g of a pitch-origin porous carbon material ("Carboron P", mfd. by Kureha Kagaku Kogyo K.K.), and 5 g carbon black (mfd. by Mitsubishi Kagaku) as an electroconductivity-imparting agent in 100 g of diethylene glycol dimethyl ether, and 1.0 g of hexamethylenediamine as a crosslinking agent was added and blended therewith, to prepare a first slurry-form solution. Then, a second solution was prepared by dissolving 4.5 g of $LiPF_6$ in 30 ml of propylene carbonate. The first solution and the second solution were blended and stirred well at room temperature for 1 hour, whereby an increase in solution viscosity was observed to indicate a rapid progress of gelation. The slurry-form solution having an increased viscosity was applied onto a 0.010 mm-thick copper foil and dried at 120° C. to evaporate the diethylene glycol dimethylether, thereby obtaining a dry electrode. Then, the dry electrode was dipped in a solution (electrolytic solution) of 1.5 g of $LiPF_6$ dissolved in 10 ml of propylene carbonate at room temperature for 4 hours, and taken out of the solution to prepare a negative electrode structure.

Preparation of Physically Crosslinked Negative Electrode Structures: Examples 1B–2B Each in 10 g of the vinylidene fluoride copolymers obtained in the above Reference Examples 1–2 was blended with 90 g of a pitch-origin porous carbon material ("Carboron P", mfd. by Kureha Kagaku Kogyo K.K.) and 90 g of N-methyl-2-pyrolidone. The resultant slurry was applied onto a 0.010 mm-thick copper foil and dried at 100° C. to evaporate the N-methyl-2-pyrrolidone, thereby obtaining a dry electrode. Then, the dry electrode was irradiated with γ-rays at a dose of 50 kGy to effect crosslinking and then dried at 100° C. under vacuum for 2 hours. The crosslinked and dried electrode was then dipped in a solution (electrolytic solution) of 1.5 g of $LiPF_6$ dissolved in 10 ml of propylene carbonate at room temperature for 4 hours, and taken out of the solution to prepare a negative electrode structure.

Preparation of Positive Electrode Structures

Each in 7 wt. parts of the vinylidene fluoride copolymers obtained in the above Reference Examples 1–2 and Comparative Examples was blended with 85 wt. parts of $LiCoO_2$, 8 wt. parts of electroconductive carbon black and 60 wt. parts of N-methyl-2-pyrrolidone. The resultant slurry was applied onto a 0.010 mm-thick aluminum foil and dried at 130° C. to evaporate the N-methyl-2-pyrrolidone, thereby obtaining a dry electrode. Then, the dry electrode was dipped in a solution (electrolytic solution) of 1.5 g of $LiPF_6$ dissolved in 10 ml of propylene carbonate at room temperature for 3 hours, and taken out of the solution to prepare a positive electrode structure.

[Evaluation]

The above-obtained solid polymer electrolyte films and positive and negative electrode structures were subjected to the following evaluation.

<Eye observation>

The positive and negative electrode structures obtained in the above examples were observed. As a result, in the structures except for that of Comparative Example 1 not containing monomethyl maleate, the composite electrode layers firmly adhered to the aluminum foil or copper foil and no peeling of the active substance was observed, whereas in the structure using the vinylidene fluoride copolymer of Comparative Example 1, the active substance could easily peeled off the aluminum foil or copper foil, thus making the electrode structures unusable.

<Negative electrode peeling strength>

The dry negative electrode structures before the dipping within the electrolytic solution in the Reference Examples and Comparative Examples were subjected to measurement of peeling strength of electrode active substance from the electroconductive substrate by a 180 deg.—peeling test according to JIS K6854, wherein results shown in Table 1 below were obtained. The peeling strength indicates a bonding strength of each vinylidene fluoride copolymer when used as a binder in each electrode.

<Measurement of ionic conductivity>

Under a stream of nitrogen having a dew point of −70° C., each of the above-mentioned gel-form solid electrode films was stamped by a punch into a disk-shaped film. The film was sandwiched between two SUS electrodes and stored in a coin-shaped battery of 2016-type (diameter: 20 mm×thickness: 16 mm), and the coin-shaped battery was taken out to the atmospheric environment. The coin-shaped battery was subjected to measurement of resistance according to the so-called Cole-Cole-Plot method. More specifically, alternating voltages having frequencies of from 0.5 mHz to 500 kHz and output voltages of 5 mV were applied to two electrodes of the coin-shaped battery to measure the resultant currents, from which the corresponding complex impedances were determined. The thus-obtained complex impedances at the respective frequencies were plotted on a complex plane to determine an intersection with a real number axis, and the value at the intersection was take as a resistance of the secondary battery film. The measurement is based on a principle that a trace of the complex impedances on a complex plane provides a semi-infinite straight line perpendicular to the real number axis as the SUS electrodes do not form an alloy with lithium ions, thus causing no charge transfer reaction. The measured resistance value was corrected based on the thickness and the area of the solid electrolyte to determine a specific resistance value, a reciprocal of which was taken as an ionic conductivity. In this way, the ionic conductivities of the respective solid electrolyte films at room temperature (25° C.) were determined, whereby results shown in Table 1 below were obtained.

<Shape-retaining temperature>

Each of the gel-form solid electrolyte films prepared in the above-mentioned respective examples was slit into rectangular test strips of 20×30 mm. Sets of such test strips from the respective examples were placed in small-size closed containers held at temperatures at intervals of 10° C. in a range of 20–100° C. and held therein for 1 hour each, followed by cooling to room temperature to observe the change of the shapes thereof with eyes. For test samples from each example, a holding temperature resulting in no shape change was taken as a shape-retaining temperature. The results are shown in Table 1.

TABLE 1

| Used copolymer | *1 VDF/HFP/MMM (*2) | Negative electrode peel strength [g/mm] | Solid polymer electrolyte film | |
| --- | --- | --- | --- | --- |
| | | | Ionic conductivity [S/cm] | Shape-retaining temp. [° C.] |
| Ref. Ex. 1 | 93/7/2 | 29 | $4.1 \times 10^{-3}$ | 50 |
| Ex. 1A | do. (C.C.) | — | $7.9 \times 10^{-3}$ | 100 |
| Ex. 1B | do. (P.C.) | — | $7.1 \times 10^{-3}$ | 80 |
| Ref. Ex. 2 | 93/7 (3FCl)/ 1 (AGE) | 32 | $3.5 \times 10^{-3}$ | 50 |
| Ex. 2A | do. (C.C.) | — | $7.5 \times 10^{-3}$ | 100 |

TABLE 1-continued

| Used copolymer | *1 VDF/HFP/MMM (*2) | Negative electrode peel strength [g/mm] | Solid polymer electrolyte film Ionic conductivity [S/cm] | Shape-retaining temp. [° C.] |
|---|---|---|---|---|
| Ex. 2B | do. (P.C.) | — | $6.6 \times 10^{-3}$ | 80 |
| Ref. Ex. 3 | 74/26/1 | 32 | $5.3 \times 10^{-3}$ | 30 |
| Ex. 3A | do. (C.C.) | — | $8.4 \times 10^{-3}$ | 100 |
| Ex. 3B | do. (P.C.) | — | $8.3 \times 10^{-3}$ | 80 |
| Ref. Ex. 4 | 84/16/1 | — | — | — |
| Ex. 4A | do. (C.C.) | — | — | — |
| Ex. 4B | do. (P.C.) | — | — | — |
| Comp. Ex. 1 | 92/8/0 | 3.1 | $1.5 \times 10^{-3}$ | 40 |
| Comp. Ex. 2 | 99/0/1 | 15 | $6.1 \times 10^{-7}$ | 100 |

*1:
VDF = vinylidene fluoride
HFP = hexafluoropropylene
3FCl = trifluoromonochloroethylene
MMM = monomethyl maleate
AGE = allyl glycidyl ether
*2:
C.C. = chemically crosslinked
P.C. = physically crosslinked According to Table 1, regarding the dry negative electrode peeling strength in a state of containing no electrolytic solution, compared with Comparative Example 1 not containing monomethyl maleate, Reference Examples 1–4 containing monomethyl maleate exhibited higher peeling strengths of negative electrodes. Further, among the systems containing the same monomethyl maleate, it is shown that the negative electrode peeling strengths (29–31 g/mm) of Reference Examples 1–4 having a lower vinylidene fluoride content due to inclusion of hexafluoropropylene or trifluoromonochloroethylene were higher than that (15 g/mm) of Comparative Example 2 having a higher vinylidene fluoride content. It is understood that the effect is attributable to an increased rubbery property accompanying the lowering in vinylidene fluoride content.

Further, Table 1 shows that the gel-form solid polymer electrolyte films obtained by crosslinking the vinylidene fluoride copolymers of Reference Examples exhibited remarkably improved heat resistance represented by shape-retaining temperatures and also increased ionic conductivities presumably attributable to the increased rubbery property.

Preparation and Evaluation of Batteries

Between the electrodes and the negative electrodes prepared by the above Reference Examples 1 and 2, the corresponding Examples and Comparative Example 1, the solid polymer electrolyte films obtained in the same Examples and Comparative Example were sandwiched to prepare batteries. Each battery was subjected to 30 charge-discharge cycles each including charging up to 4.2 volts at a constant current of 3 mA, continued charging for 1.5 hours at a constant voltage and discharging down to 2.5 volts at a constant current of 3 mA at temperatures of 25° C. and 60° C., respectively, whereby the percent capacity retention in the 30th cycle was measured. The results are shown in Table 2 below.

TABLE 2

| Polymer matrix | Crosslinking of layers[1] positive electrode | inter-mediate | negative electrode | Percentage capacity retention in 30th cycle at 25° C. (%) | at 60° C. (%) |
|---|---|---|---|---|---|
| Ref. Ex. 1 | N.C. | N.C. | N.C. | 96.2 | short-circuited[2] |
| Ex. 1A | N.C. | C.C. | C.C. | 96.5 | 90.1 |
| Ex. 1B | N.C. | P.C. | P.C. | 96.8 | 92.3 |
| Ref. Ex. 2 | N.C. | N.C. | N.C. | 95.8 | — |
| Ex. 2A | N.C. | C.C. | C.C. | 96.2 | — |
| Ex. 2B | N.C. | P.C. | P.C. | 96.3 | — |
| Comp. Ex. 1 | N.C. | N.C. | N.C. | 92.1 | — |

[1]:
N.C. = not crosslinked
C.C. = chemically crosslinked
P.C. = physically crosslinked
[2]Excessive current flowed from the first cycle, so that the charging was failed.

In view of Table 2, it is understood that the polymeric solid electrode films of the present invention provided batteries of stable performances than a conventional solid polymer electrolyte film formed from vinylidene fluoride-hexafluoropropylene copolymer (Comparative Example 1) presumably owing to improved adhesion with electroconductive substrates and improved heat resistance due to crosslinking.

INDUSTRIAL APPLICABILITY

As described above, the performances of a non-aqueous battery are improved owing to improved adhesion with electroconductive substrates, improved retentivity of powdery electrode materials and ionic conductivity and further remarkably improved heat resistance, by forming a laminate structure including a positive electrode layer, a negative electrode layer and an intermediate gel layer of the non-aqueous battery with a polymer solid electrolyte using as a polymer matrix a vinylidene fluoride copolymer which has a vinylidene fluoride content of 50–97 mol. % copolymerized with an unsaturated dibasic acid monoester or an epoxy group-containing vinyl monomer and further has been crosslinked.

What is claimed is:

1. A solid electrolyte-type non-aqueous battery, comprising: a positive electrode layer comprising a powdery positive electrode material doped with and liberating lithium and a binder for binding and holding the powdery positive electrode material, a polymeric solid electrolyte layer comprising a polymer matrix, and a negative electrode layer comprising a powdery negative electrode material and a binder for binding and holding the powdery negative electrode material; the positive electrode layer, the polymeric solid electrolyte layer and the negative electrode layer being laminated in this order and each being impregnated with a non-aqueous electrolytic solution, wherein
at least the polymer matrix forming the polymeric solid electrolyte layer, among the binder forming the positive electrode layer, the polymer matrix forming the polymeric solid electrolyte layer, and the binder forming the negative electrode layer, comprises a vinylidene fluoride copolymer which contains 50–97 mol % of vinylidene fluoride monomer and 0.1–5 mol % of a monoester of unsaturated dibasic acid or an epoxy group-containing vinyl monomer and further has been crosslinked.

2. A non-aqueous battery according to claim 1, wherein the vinylidene fluoride copolymer has been crosslinked in the presence of a crosslinking agent selected from the group consisting of polyamines, polyols and polymerizable crosslinking agents having an unsaturated bond, and a radical generator.

3. A non-aqueous battery according to claim 1, wherein the vinylidene fluoride copolymer has been crosslinked by irradiation with electron beam or γ-rays.

4. A non-aqueous battery according to any of claims 1–3, wherein at least one of the powdery positive electrode material and the powdery negative electrode material contains an electroconductivity-imparting agent comprising carbon black.

5. A non-aqueous battery according to claim 1, wherein the monoester of unsaturated dibasic acid is at least one selected from the group consisting of monomethyl maleate, monoethyl maleate, monomethyl citraconate, and monoethyl citraconate.

6. A non-aqueous battery according to claim 1, wherein the epoxy group-containing vinyl monomer is at least one selected from the group consisting of allyl glycidyl ether, methallyl glycidyl ether, vinyl glycidyl ether and crotonic acid glycidyl ether.

7. A non-aqueous battery according to claim 1, wherein the non-aqueous electrolytic solution comprises an electrolyte and a non-aqueous solvent.

8. A non-aqueous battery according to claim 7, wherein the electrolyte is selected from the group consisting of $LiAsF_6$, $LiClO_4$, $LiBF_4$, $LiCl$, $LiBr$, $LiCH_3SO_3$, $LiFD_3SO_3$, $LiN(CF_3OSO_2)_2$, $LiC(CF_3OSO_2)_3$, $LiN(CF_3SO_2)_2$, and $LiC(CF_3SO_2)_3$.

9. A non-aqueous battery according to claim 7, wherein the non-aqueous solvent is at least one organic solvent selected from the group consisting of propylene carbonate, ethylene carbonate, 1,2-dimethoxyethane, 1,2-diethoxyethane, dimethyl carbonate, diethyl carbonate, methyl ethyl carbonate, γ-butyrolactone, methyl propionate, ethyl propionate, and diethylene glycol dimethyl ether.

10. A non-aqueous battery according to claim 1, wherein the polymeric solid electrolyte layer is a gel having a thickness of 0.002–1.000 mm.

11. A non-aqueous battery according to claim 1, wherein the binder forming the positive electrode layer also contains said vinylidene fluoride copolymer.

12. A non-aqueous battery according to claim 1, wherein the binder forming the negative electrode layer also contains said vinylidene fluoride copolymer.

* * * * *

UNITED STATES PATENT AND TRADEMARK OFFICE
CERTIFICATE OF CORRECTION

PATENT NO.     : 6,372,388 B1                                    Page 1 of 1
DATED          : April 16, 2002
INVENTOR(S)    : Takumi Katsurao et al.

It is certified that error appears in the above-identified patent and that said Letters Patent is hereby corrected as shown below:

<u>Title page,</u>
Item [73], change the name of the Assignee to read -- Kureha Kagaku Kogyo Kabushiki Kaisha --

Signed and Sealed this

Eleventh Day of June, 2002

Attest:

Attesting Officer

JAMES E. ROGAN
*Director of the United States Patent and Trademark Office*